UNITED STATES PATENT OFFICE.

JACOB F. SAIGER, OF SHELBY, OHIO.

IMPROVEMENT IN PRESERVING BUTTER.

Specification forming part of Letters Patent No. 99,240, dated January 25, 1870.

*To all whom it may concern:*

Be it known that I, JACOB F. SAIGER, of Shelby, in the county of Richland and State of Ohio, have invented a new and valuable Improvement in Means for Preserving Butter; and I do hereby declare that the following is a full, clear, and exact description of the same.

My invention relates to means for preserving butter; and it consists in a novel combination of chemical substances intended and adapted to preserve butter from taint without impairing its flavor.

To this end I make a solution consisting of one ounce of boracic acid, one-fourth ounce of sulphite of soda, and one-fourth ounce of saltpeter, and mix said solution thoroughly with eight pounds of butter. The quantity of said chemicals may be slightly added to or subtracted from; but the above formula is found, by my experiments, to be very nearly, if not quite, the best that can be given.

I am aware that sulphurous acid has been used for the purpose named; but I find, by experiment, that when used singly in quantity sufficient to preserve butter from taint by decomposition it imparts to it a slight sulphurous taste. By my formula such taste is avoided.

I claim as my invention—

The combination of boracic acid, sulphite of soda, and saltpeter, with butter, in the proportions substantially as described, and for the purpose specified.

In testimony that I claim the above I have hereunto subscribed my name in the presence of two witnesses.

JACOB F. SAIGER.

Witnesses:
E. W. ANDERSON,
CHARLES KENYON.